May 18, 1965      W. H. ROBINSON      3,184,090

FITMENT FOR JARS AND THE LIKE

Filed July 25, 1962      3 Sheets-Sheet 1

INVENTOR
William H. Robinson
BY
ATTORNEY

May 18, 1965 W. H. ROBINSON 3,184,090
FITMENT FOR JARS AND THE LIKE
Filed July 25, 1962 3 Sheets-Sheet 2

INVENTOR
William H. Robinson
BY
ATTORNEY

May 18, 1965 W. H. ROBINSON 3,184,090
FITMENT FOR JARS AND THE LIKE
Filed July 25, 1962 3 Sheets-Sheet 3

INVENTOR
William H. Robinson
BY
ATTORNEY

United States Patent Office 3,184,090
Patented May 18, 1965

3,184,090
FITMENT FOR JARS AND THE LIKE
William H. Robinson, New Vienna, Ohio, assignor to Buckeye Molding Company, New Vienna, Ohio, a corporation of Ohio
Filed July 25, 1962, Ser. No. 212,317
4 Claims. (Cl. 215—48)

The present invention relates to a fitment for jars.

Generally, there is provided a relatively shallow cup molded of a polyethylene or other flexible and resilient plastic material and having downwardly and inwardly inclined conical side walls adapted to be snugly embraced by the walls of the conventional tapered mouth of a jar, for example, an apothecary jar.

The inner surface of the side walls of the cup is provided with a continuous bead or with a series of lugs spaced sufficiently above the bottom of the cup to receive and snap over a mating bead on the lower outer edge of a generally cylindrical downward extension of a hollow knob-type jar of glass, molded hard plastic or other suitable material.

Conversely, the lugs could be formed on the rim of the top extension for engagement under a continuous bead on the fitment cup's inner wall surface. Also, the bottom wall of the cup could be partially or completely omitted, if desired.

It is, accordingly, an object of the invention to provide a resilient fitment for the rim of the top of a jar, as for example an apothecary jar, which provides a reliable substantially hermetic seal between the jar opening and its stopper-type closure top.

It is another object of the invention to provide a fitment of the type disclosed which is quickly and easily attached to the jar top by snap-on-type connecting means.

It is a further object of the invention to provide a fitment of the character described which completely covers the portion of the jar top that would normally be exposed to the jar contents.

It is still another object of the invention to provide a fitment for the top of a jar in the form of a frustoconical annulus to facilitate placement on or removal from the top and for economy of material.

It is a further object of the invention to provide a fitment of the character described molded of relatively inert flexible and resilient plastic material, such as polyethylene.

Other and further objects of the invention will become apparent from a reading of the following specification, taken in conjunction with the drawings, in which.

Figure 1:
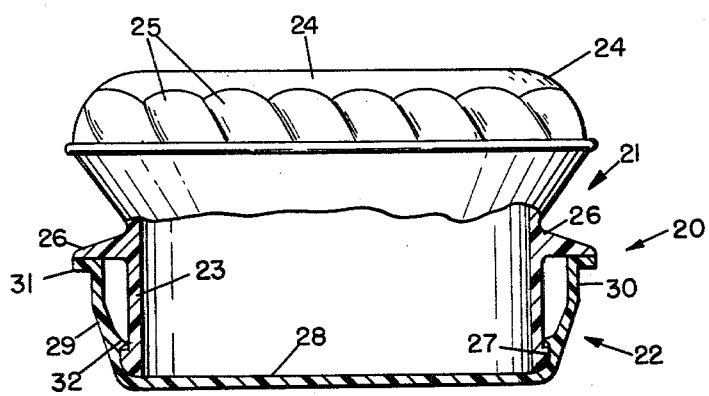
FIGURE 1 is an elevational view, partly in vertical axial section, of a preferred embodiment of the invention.
Figures 2, 3:
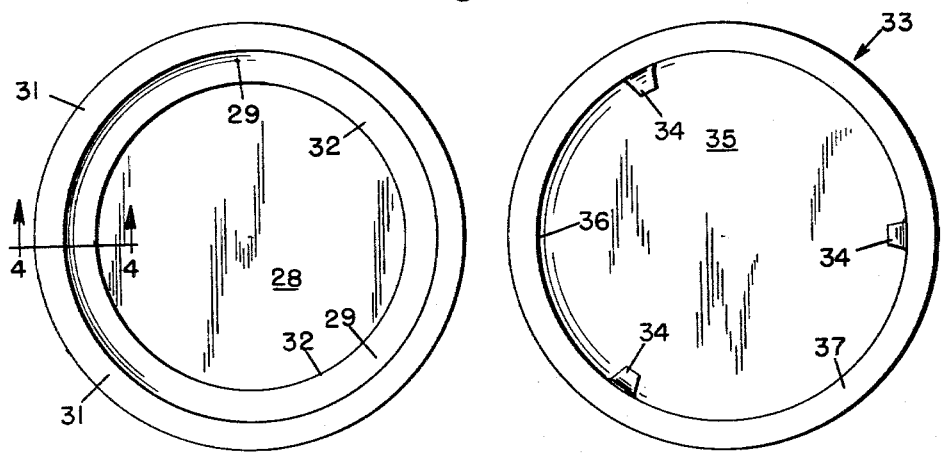
FIGURE 2 is a plan view of the fitment part of FIGURE 1.
FIGURE 3 is a plan view of a modified form of the fitment.

With reference to FIGURES 1 and 2 of the drawings, numeral 20 generally designates a stopper-type closure or top for a jar, as for example an apothecary jar, of conventional design (not shown). Top 20 consists of core portion 21 and a resilient sealing cup portion 22. The core portion 21 is herein disclosed as being a hollow body molded of relatively hard and inflexible plastic material, preferably a clear or tinted transparent material matching the jars in color and appearance. Core portion 21 has a generally cylindrical base 23 and an enlarged flat knob 24 provided with a knurled periphery 25 for producing an improved gripping surface. The upper outer surface of the cylindrical base 23 has an integral outwardly extending flange 26 while the lower outer surface thereof has a stepped bead 27 (FIGURE 4) for cooperation with mating portions of the jar sealing cup 22.

The jar sealing cup 22 is molded of a somewhat flexible and resilient plastic material, such as polyethylene. Cup 22 has a flat circular bottom disc 28 and upwardly and outwardly flaring frustoconical side walls 29 which are resiliently pressed into sealing engagement with the usual conically ground or molded walls of the mouths of conventional jars as, for example apothecary jars. Side walls 29 are desirably more conically tapered toward their lower extremities than are the mating walls of the jar mouth to facilitate insertion and to effect a better compressive seal as the jar top is pushed down into closing position.

The upper extremities 30 of side walls 29 desirably approach cylindrical shape and terminate in an outwardly extending flat annular flange 31, the upper surface of which bears flush against the flat under face of core flange 26, being held thereagainst by the action of a cusp-shaped circumferential bead 32 molded on the inner surface of side walls 29 of cup 22 adjacent the bottom 28 thereof. The cusp-shaped bead engaged (with a snap-on type of action) over the upper flat edge of the annular rim bead 27 on core cylinder 23 as the cup 22 is resiliently pressed thereon.

Figure 4:
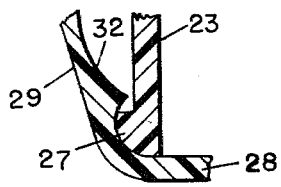
FIGURE 4 is an enlarged fragmentary elevational view of the lower left portion of FIGURE 1, in section, taken as on line 4—4 of FIGURE 2.

In the species of FIGURE 3, a cup 33 differs from cup 22 described above by the substitution of a plurality of cusp-shaped lugs 34 for the bead 32 previously described, the former being of the same shape in vertical radial cross-section as the latter, FIGURE 4. A bottom 35, side walls 36 and flange 37 closely correspond to their counterparts, 28, 29 and 31, respectively, to the cup 22 of FIGURES 1 and 2.

Figure 5:
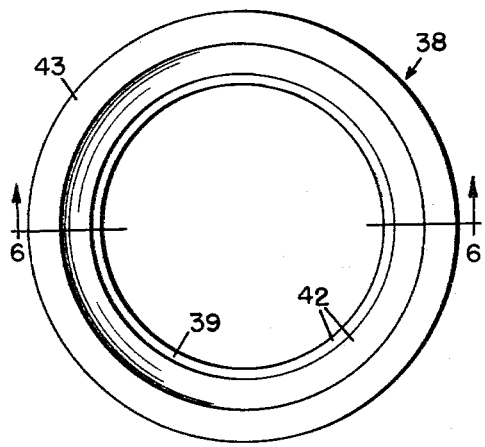
FIGURE 5 is a plan view of another species of the fitment.
Figure 6:
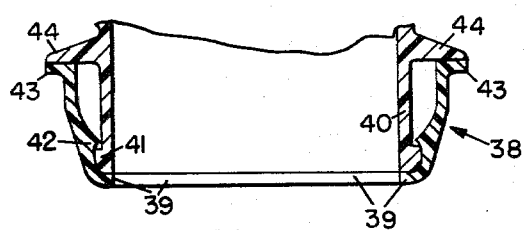
FIGURE 6 is a fragmentary elevational view of a top and the fitment of FIGURE 5, in axial section on line 6—6 of FIGURE 5.

In the modification of FIGURES 5 and 6, an annular frustoconical jar sealing sleeve 38 is substituted for the cup 22 of the first described species. Sleeve 38 may be thought of as a cup with the central portion of its disc-shaped bottom omitted or cut away so as to leave an inwardly directed narrow flange 39 engaging under the lower edge of a cylindrical core portion 40. Core 40 has a bead 41 that is embraced between flange 39 and a circumferential cusp-shaped bead 42 on the inner walls of the sleeve 38. Parts 38 and 40 have abutting flanges 43 and 44, respectively, corresponding to flanges 31 and 26 described above. Parts 40, 41 and 42 similarly correspond to parts 23, 27 and 32 of the disclosure of FIGURES 1 and 2, respectively.

Figure 7:
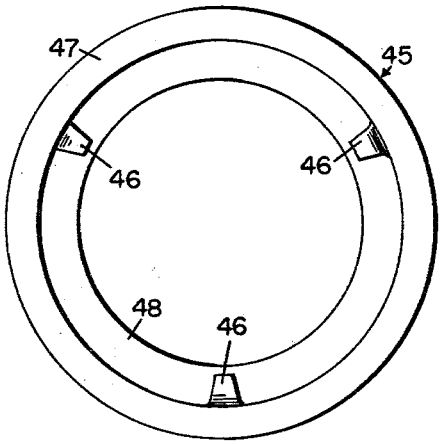
FIGURE 7 is a plan view of a further modification of the fitment.
Figure 8:
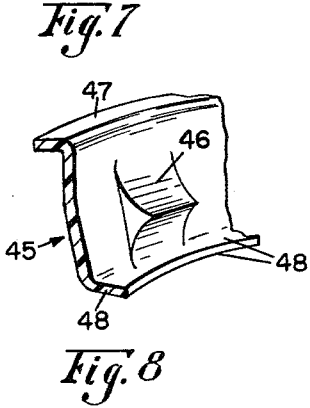
FIGURE 8 is an enlarged fragmentary perspective view of the showing of FIGURE 7.

In the species of FIGURES 7 and 8, a frustoconical sleeve 45 differs from sleeve 38 by the substitution of a plurality of spaced cusp-shaped lugs 46 for the cusp-shaped bead 42 of FIGURE 6. Sleeve 45 has upper and lower flanges 47 and 48 outwardly and inwardly directed, respectively, and corresponding to flanges 43 and 39 of FIGURES 5 and 6.

Figure 9:
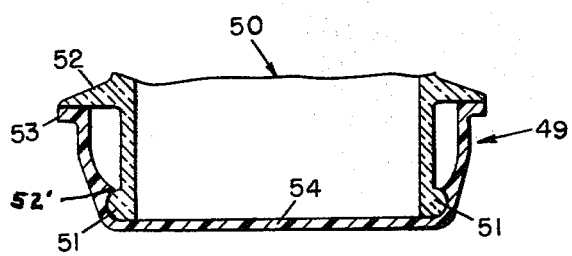
FIGURE 9 is an elevational view of a further modification, in vertical axial section.

In the modification of FIGURE 9, a polyethylene cup 49, corresponding to cup 22 of FIGURES 1 and 2, is snapped onto a core structure 50 differing from core 21 primarily in being molded of glass instead of hard plastic material. The lower edge of the core 50 has a half-round peripheral bead 51 which engages under a cusp-shaped inner circumferential bead 52 molded on cup 49. Core 50 and cup 49 have mating flanges 52 and 53, and the cup has a disc-shaped bottom 54, which parts correspond, respectively, to elements 26, 31 and 28 of the disclosure of FIGURE 1.

Figure 10:
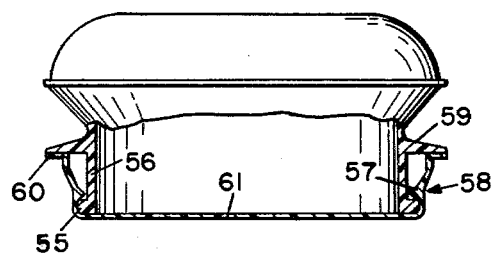
FIGURE 10 is an elevational view, partly in vertical axial section, of another species of the invention.
Figure 11:
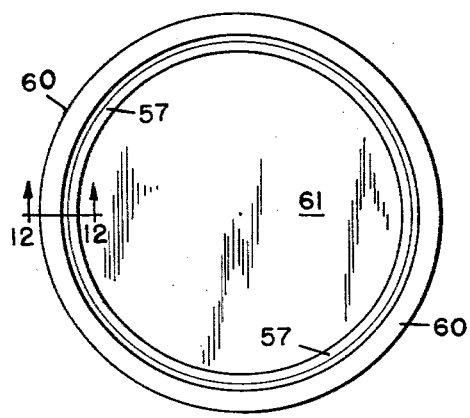
FIGURE 11 is a plan view of the fitment of FIGURE 10.
Figure 12:
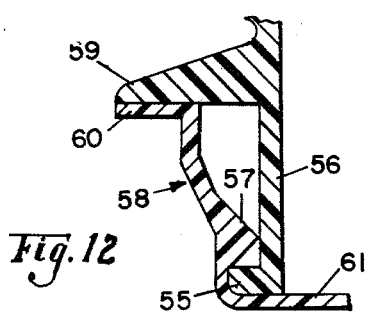
FIGURE 12 is an enlarged fragmentary elevational view of the lower left portion of FIGURE 10, in section, taken on line 12—12 of FIGURE 11.

FIGURES 10, 11 and 12 disclose a fitment having a considerably greater diameter-to-height ratio than the fitment of FIGURES 1 and 2.

Accordingly, a wider peripheral bead 55 is provided on its core cylinder 56 and a larger cooperating bead 57 is molded on its polyethylene cup 58. Core cylinder 56 has a flange 59 and cup 58 has a flange 60 and a bottom 61, respectively, corresponding to flanges 26 and 31 and the cup bottom 28 of the FIGURE 1 species.

Figure 13:
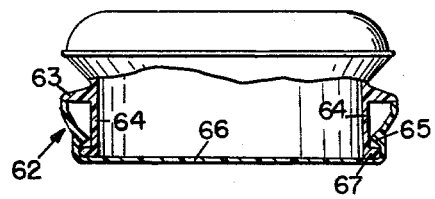
FIGURE 13 is an elevational view, partly in vertical axial section, of another species of the invention.
Figure 14:
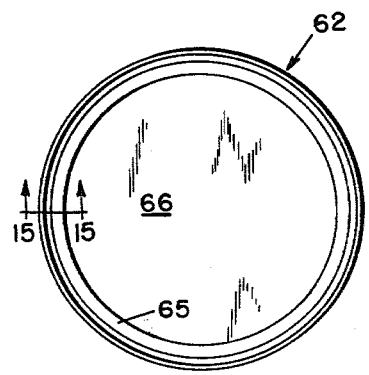
FIGURE 14 is a plan view of the fitment shown in FIGURE 13.
Figure 15:
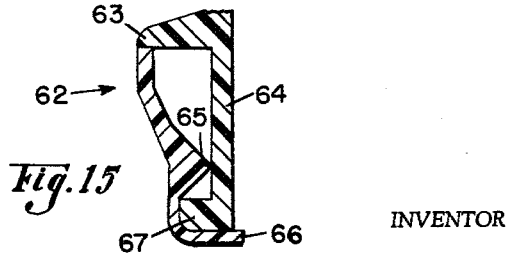
FIGURE 15 is an enlarged fragmentary elevational view of the lower left portion of FIGURE 13, in section, taken on line 15—15 of FIGURE 14.

In the modification of FIGURES 13, 14 and 15, a plastic cup 62 differs from cup 58 of FIGURES 10 and 12 primarily in the omission of a top flange. Instead, its upper rim engages under the periphery of a flange 63 molded on a hard plastic core 64. Numerals 62–67 designate parts corresponding to elements 22, 26, 23, 32, 28 and 27, respectively, of the disclosure of FIGURES 1 and 2.

While but several forms of the invention have been shown and described herein, it is obvious that other modifications and/or equivalents may be employed without departing from the scope of the invention, which is defined in the appended claims.

What is claimed is:
1. A stopper type closure for jars or the like, comprising a relatively rigid core member having a knob portion and a substantially cylindrical support portion having an open bottom extending downwardly from the knob portion, said support portion being adapted for insertion into the circular mouth of the jar, and an integral annular outwardly extending flange surrounding the upper extremity of said support portion adjacent the knob, and a second integral outwardly extending flange of substantially less diameter than the first mentioned flange and having a flat top surface and an arcuate surfaced outer rim surrounding the lower extremity of the support portion, a sealing member of resilient material including an annular cylindrical side wall of a diameter in excess of the diameter of said cylindrical support portion and coaxially spaced there from a distance in excess of the diameter of said second flange and having its top abutting the bottom surface of said first-mentioned flange, and an inverted integral downwardly tapering frusto-conical wall integral with and depending from said cylindrical side wall into close engagement with the arcuate rim of said second flange and having an annular bottom portion extending beneath and closely engaging the underside of said second flange and the bottom of said cylindrical support portion, and at least one inwardly extending protuberance of cusp-shaped cross section interiorily of the frusto-conical wall adjacent its annular bottom portion and engageable over said second flange with a snap-on action.

2. The structure of claim 1 wherein the integral annular outwardly extending flange surrounding the upper extremity of the support portion has a flat bottom surface, and the top of the annular cylindrical side wall of the sealing member is provided with an outwardly extending annular flange having a flat top surface abutting the flat bottom surface of the last-named flange.

3. The structure of claim 1 wherein said at least one inwardly extending protuberance of cusp-shaped cross section comprises an annular bead.

4. The structure of claim 1 wherein said at least one inwardly extending protuberance of cusp-shaped cross section comprises a plurality of radially spaced lugs.

References Cited by the Examiner

UNITED STATES PATENTS

| | | | |
|---|---|---|---|
| 2,696,319 | 12/54 | Menefee | 215—48 |
| 2,830,722 | 4/58 | Darmstadt | 215—13 |
| 3,070,251 | 12/62 | Mangranite | 215—48 |

FOREIGN PATENTS 70,924   9/59   France.
         (Addition to 1,122,373)

FRANKLIN T. GARNETT, *Primary Examiner.*

EARLE J. DRUMMOND, *Examiner.*